United States Patent Office 3,119,663
Patented Jan. 28, 1964

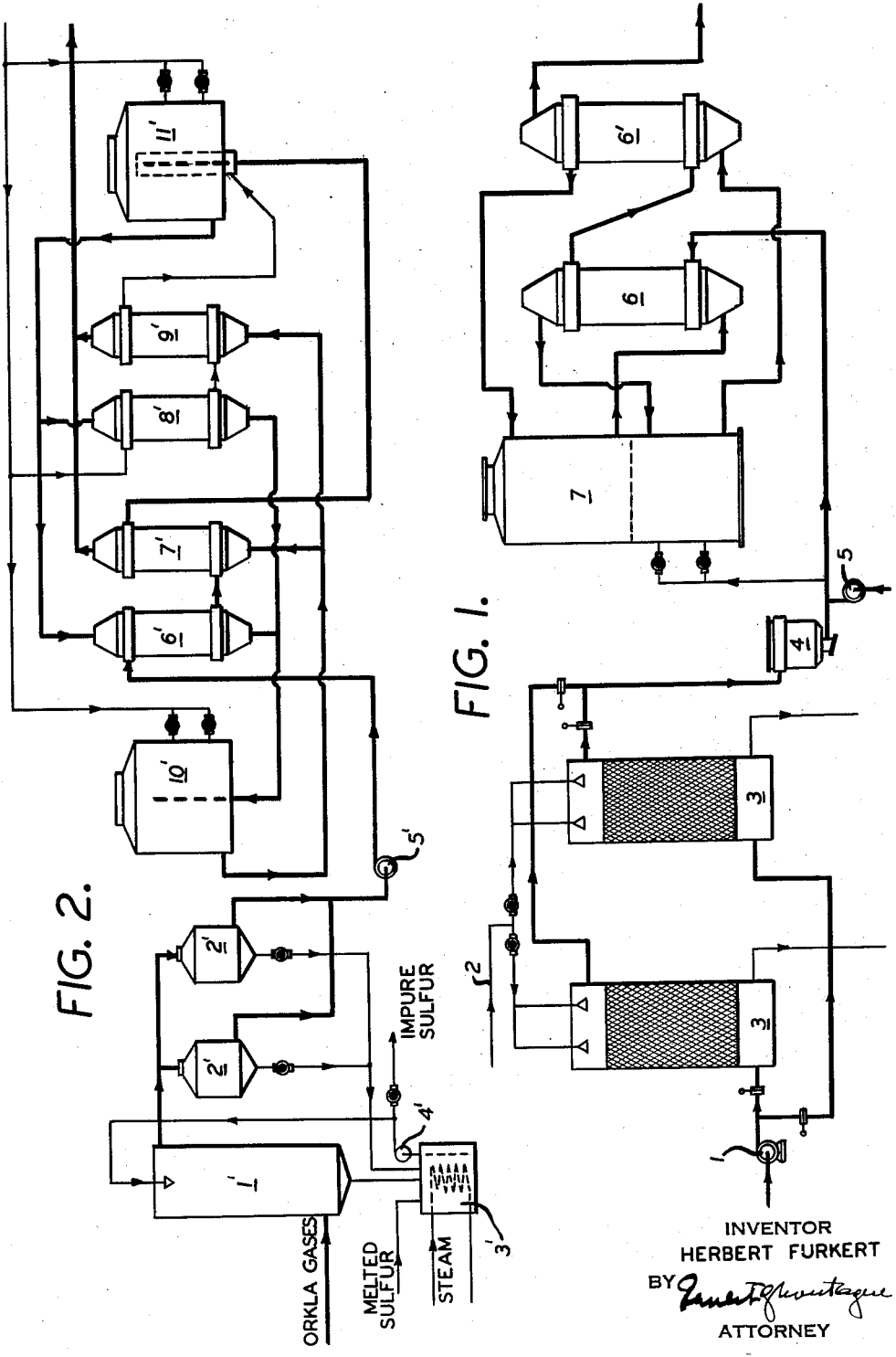

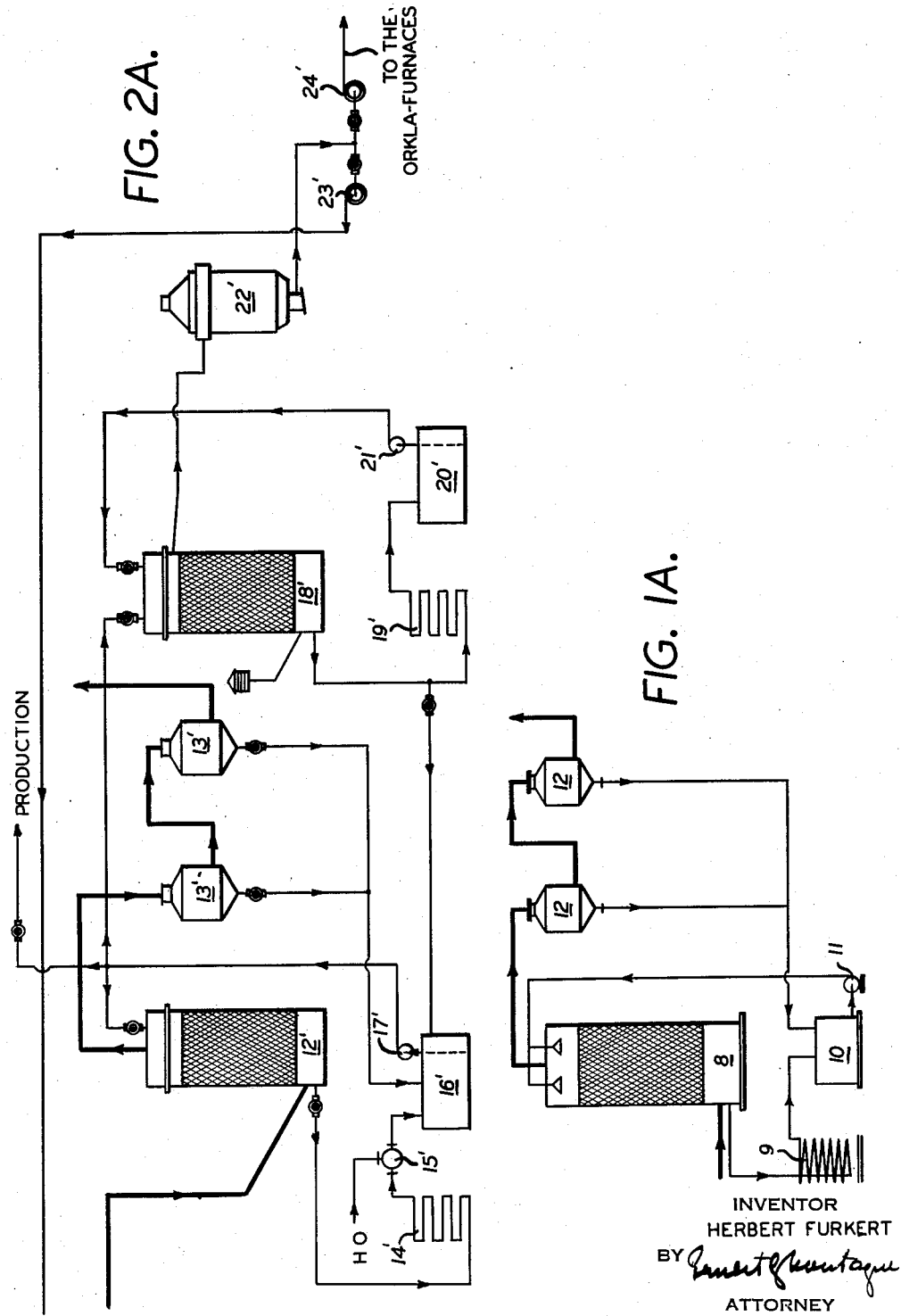

3,119,663
RECOVERY OF PRODUCTS FROM WASTE GAS
Herbert Furkert, Junkersdorf, near Cologne, Germany, assignor to Fa. Chemiebau Dr. A. Zieren G.m.b.H., Cologne (Rhine), Germany, a corporation of Germany
Filed Sept. 23, 1958, Ser. No. 762,686
2 Claims. (Cl. 23—175)

The present invention relates to a process for the recovery of hydrogen sulfide, carbon disulfide, carbon oxysulfide and similar sulfur compounds from moist waste gas, which sulfur compounds lend themselves to oxidation to $SO_3$ and at some instances $H_2O$ and $CO_2$.

This is a continuation-in-part application of the copending application Ser. No. 332,492, filed January 21, 1953, now abandoned.

In the manufacture of synthetic materials by the viscose process, in the Orkla process, Claus process and Boliden process, waste gas containing carbon disulfide and hydrogen sulfide occurs at several production stages. The amounts of these sulfur compounds in the waste gas vary according to the origin thereof. In a staple fiber plant, one cubic meter of waste gas from the precipitation bath may contain, for example, 23.4 gr. $CS_2$ and 9.9 gr. $H_2S$, from the xanthogenation 23.9 gr. of $CS_2$ and from the precipitation and after-treatment of the fiber 1.7 gr. $CS_2$ and 0.21 gr. $H_2S$. A mixture of all the waste gas fractions then may contain, for example, 2.3 gr. $CS_2$ and 0.38 gr. $H_2S$ per cubic meter. In a viscose process production of 100 short tons per day about 270,000 m.³ of output air with, e.g., 0.61 vol. percent $CS_2$ and 0.79 vol. percent $H_2S$ fall out. In applying the present invention, about 26 short tons of $H_2SO_4$ correspondingly 33 short tons of $H_2SO_4$ of a concentration of 78% are gained daily. This amount of $H_2SO_4$ is impressive, if it is taken into consideration, that the insert of $H_2SO_4$ for 100 short tons of viscose amounts for instance to 110 short tons of $H_2SO_4$.

In each viscose manufacturing plant the devices for xanthogenation and for precipitation and after treatment of the fiber are subjected to suction by a system of conduits of aluminum or artificial material by a centrally arranged blower, in order to protect the workers from injuries. The blower feeds usually the gas mixture into the atmosphere through any suitable device. If now the operation, in accordance with the present invention, is contemplated, the gas mixture is fed into the plant producing $H_2SO_4$ instead of into such suitable device. As it is important in all catalytic $H_2SO_4$ processes, it is equally important in the present case, to operate continuously. Interruptions and, thereby, cooling leads to temperatures below the dew point of the gases and, thereby to a corresion in the apparatus and in the conduits.

By exploitation of the output gases in the Orkla arrangements, where the sulfur output is only 56%, additional 22% of sulfur may be gained by the use of the present process, which have been lost in the atmosphere before. The remaining 22% of sulfur goes into the other product of the Orkla-process, namely the copper matte.

In an actual Orkla-arrangement, for example, 170 short tons of sulfur are gained daily. The daily output gas amounts to 625,000 Nm.³ and is composed as follows:

3.850 vol. percent $SO_2$
0.450 vol. percent $H_2S$
0.597 vol. percent $CS_2$
0.979 vol. percent COS
0.063 vol. percent $S_2$
0.6 vol. percent CO
12.000 vol. percent $CO_2$
81.461 vol. percent $N_2$ Since this output gas does not contain oxygen, air must be added for the catalytic oxidation. This air volume amounts to 650,000 Nm.³ daily as found by tests and thermotechnical calculations. The gas is, thereby, thinned so much, that it is not burnable.

The present invention deals with waste gases, the content of which of $H_2S$, $CS_2$, COS, sulfur vapors, mercaptans is below the low limit of inflammability if necessary upon adding of air. It is only possible to consider ignition limits, if the gas mixture contains sufficient oxygen, i.e., more oxygen as is theoretically required. This is usually the case in output air in the viscose manufacture, however the mentioned other waste gases do not contain oxygen. They are not burnable even after adding the required air volume. If in waste-gas-air mixtures the content of burnable sulfur compounds is disposed slightly above the lower limit of inflammability, it is still not advisable to provide a burning in the ordinary sense. It is then rather difficult, to maintain a continuous burning.

The mentioned waste gases can be free of $SO_2$, or they may contain $SO_2$ at a concentration which would not suffice for the oxidation after adding of air without the other sulfur compounds. This is below 3 vol. percent $SO_2$ in the gas-air mixture to be oxidized.

On account of the content of hydrogen sulfide, the waste gas is a constant source of annoyance to the surroundings of such plants. It has therefore been proposed to scrub the waste gas with a caustic soda solution to remove the hydrogen sulfide and to decompose the resulting sulfide solution with waste sulfuric acid or carbon dioxide in order to recover the hydrogen sulfide in a concentration suitable for reclaiming. Although it is possible, by means of one of the said methods, to recover all of the hydrogen sulfide, the carbon disulfide is lost unless it is partly recovered in the known manner in the immediate neighborhood of the spinning machine.

According to another method, the iron hydroxide mass, known as suitable for the purification of conventional gas used for lighting and heating purposes is utilized to eliminate the hydrogen sulfide at least from the more concentrated waste gas fractions and activated carbon is used subsequently in order to recover the carbon disulfide in the known manner. The utilization of spent material from the gas purification encounters, however, the same difficulties as in the manufacture of conventional gas used for lighting and heating purposes or coke; a satisfactory adsorption of carbon disulfide vapor by means of activated carbon requires a complete prior removal of hydrogen sulfide from the waste gas. If not completely removed, the hydrogen sulfide is oxidized to sulfur which renders the carbon inactive by deposition in the pores. Moreover, considerable expenditures of steam are necessary for the regeneration of the carbon.

I have now discovered that the entire sulfur content of such waste gas can not only be very efficiently removed, but also utilized to great advantage if, after preheating the waste gas to the corresponding initial temperature, it is passed over catalysts in order to produce sulfur trioxide, which can be absorbed in the known manner in sulfuric acid, for example in 78 percent sulfuric acid, and thereby be converted into sulfuric acid itself. For the preheating it is advantageous to utilize the heat content of the catalyzed gas. In order to avoid the formation of aggressive condensates, the catalyzed gas should not be cooled below its dew point in this operation.

The afore-mentioned requirement is easy to fulfill because the ignition temperatures for the combustion of carbon disulfide (105° C.) and hydrogen sulfide (290° C.) to sulfur dioxide, carbon dioxide and steam are considerably lower than the optimum equilibrium temperature of the catalytic oxidation of sulfur dioxide to sulfur trioxide (410° C.).

The waste gas from the manufacture of artificial silk and staple fiber is practically free from dust. Therefore it needs no washing or other purification prior to applying thereto the process of the present invention. A drying of the waste gas may be included as sole pre-treatment in case of a high moisture content. If it is intended to produce concentrated sulfuric acid, say 98 percent sulfuric acid, the waste gas can be dried by means of the sulfuric acid used by the viscose plant in question. The higher water content of the input sulfuric acid can be readily compensated for by a better utilization of the existing vacuum evaporators for the spinning bath liquor. The water added in the absorption of the sulfur trioxide from the catalyzed gas then depends upon the amount of carbon disulfide which has been oxidized. If it is intended to produce 78% $H_2SO_4$, it is sufficient to remove any excessive moisture which may be present by simply cooling the waste gas.

FIGS. 1 and 1a indicate a flow sheet of a direct catalysis plant for the production of sulfuric acid.

I find it expedient first to remove hydrogen sulfide from the waste gas fraction deriving from the precipitation and after-treatment of the fiber by means of caustic soda solution because this fraction is too diluted for direct treating. The sodium sulfide solution 2, which is thereby produced, is then treated with carbon dioxide, preferably in form of ordinary combustion gas 1, in order to decompose the sodium sulfide and to liberate the hydrogen sulfide again. This operation can be done in packed towers 3 where the liquid flows in counter current to the gas. The gas enriched in hydrogen sulfide leaves the towers at the top and passes the spray separator 4, in order to remove droplets of liquid entrained. The concentration of hydrogen sulfide obtainable in this manner is unsuitable for combustion without additional heat supply. But the resulting gas can be used advantageously for the production of sulfuric acid by means of direct catalysis according to the present invention in mixing it with the waste gas fractions originating from the preparation of the spinning bath and from the xanthogenation. These gas fractions are delivered by a blower 5. The exit gas of the towers 3 is too low in oxygen content to be treated separately. This is shown by the analysis given below (1 vol. $H_2S$ needs 2 vols. $O_2$ theoretically, but far more practically). But by mixing the three gases mentioned above, the oxygen content of the mixture is sufficient for being utilized according to the invention:

| | Flow, m.³/d. | Percents by volume | | | | |
|---|---|---|---|---|---|---|
| | | $CS_2$ | $H_2S$ | $CO_2$ | $O_2$ | $N_2$ |
| Combustion gas | 30,000 | | 4.1 | 8.2 | 8.7 | 79.0 |
| Gases from Preparation of the spinning bath | 180,000 | 0.675 | 0.64 | 0.035 | 20.65 | 78.0 |
| Xanthogenation | 90,000 | 0.090 | | | 20.81 | 78.5 |
| Mixture | 300,000 | 0.61 | 0.79 | 0.84 | 19.53 | 78.25 |

The composition of the waste gas mixture is excluding the moisture content equal to the saturation at 25° C. About 270,000 m.³/d. of the mixture enter now the heat exchangers 6 for being preheated by means of hot waste gas which had been previously catalyzed. In the first heat exchanger 6 the gas mixture is heated up from 25 to 161° C., in the second 6" to 200° C. Then the gas mixture flows into the converter 7 having any conventional vanadium or other suitable catalyst of the types well known in making sulfuric acid by the contact process. The catalyst is arranged in layers of a total height of about six feet and preferably in the customary manner on trays one stacked above the other. In the converter 7 the oxidation of the carbon disulfide and hydrogen sulfide to sulfur trioxide, carbon dioxide and water takes place at an overall yield of more than 98 percent. The heat of reaction would raise the temperature of the gas and vapor mixture by 420° C., that is to say to 620° C., if no cooling were applied. In the first—say two or three—layers of catalyst the yield of reaction is about 86% and the partly catalyzed gas leaves the converter 7 say at 570° C., is cooled in the first heat exchanger 6 down to 400° C. and enters then the lower part of the converter 7 which contains also, say two or three layers of catalyst. The conversion yield in the lower part is about 12%. The reacting gas is cooled by injection of the remaining 30,000 m.³/d. of waste gas mixture which is branched off before preheating. The catalyzed gas leaves at 409° C. and is cooled down in the second heat exchanger to 360° C. At this and the other temperatures in the heat exchangers, a formation of condensate cannot take place, particularly if low wall temperatures are avoided in preheating the waste gas, such as by applying the co-current principle.

The hot catalyzed gas is then passed into an absorption tower 8 through which 78 percent sulfuric acid is circulated via the feed tank 10 by the pump 11 in order to absorb a part of the sulfur trioxide under formation of sulfuric acid. The heat supplied by the gas and the reaction heat are eliminated from the acid cycle by cooling at 9 with water. Moreover, a quantity of sulfuric acid, corresponding to the amount of sulfur trioxide, is removed as the product of the herein described operation. Because of the presence of water vapors a sulfuric acid fog is formed in the tower during the cooling of the sulfur trioxide gas. This fog is not absorbed by the sulfuric acid, but it can be electrostatically precipitated at 12, if desired, with a fine spray of water. The acid flowing from the electrofilters and comprising say 40 percent of the production acid passes into the cycle of the absorption tower.

At a conversion efficiency of more than 98% and an overall yield of the total process from the amount and composition of the waste gas mixture mentioned above are produced 26 metric tons of $H_2SO_4$ or about 33 tons acid 60° Bé. per day of 24 hours. The waste gas volume of 300,000 m.³/d. corresponds to a production of 100 tons per day staple fiber.

It is obvious that the present invention can be used in conjunction with diverse gases having a composition other than waste gases from the manufacture of viscose. Fundamentally, all sulfur compounds in form of gas or vapor as well as sulfur vapors as such can be utilized in this manner, i.e., oxidizing them with a sufficient excess of air or oxygen to sulfur trioxide and converting the latter into sulfuric acid.

The following examples will serve to illustrate the present invention:

*Example 1*

A waste gas mixture, being saturated with moisture at 25° C. and having the following composition (excluding the moisture content)

Percent by volume
$CS_2$ ---------------------------------------- 0.61
$H_2S$ ---------------------------------------- 0.79
$CO_2$ ---------------------------------------- 0.84
$O_2$ ----------------------------------------- 19.56
$N_2$ ----------------------------------------- 78.20 is preheated by means of hot waste gas which had been previously catalyzed. The mentioned 19.56% by volume of $O_2$ are contained in the waste gas of the viscose manufacturing plant. This is, thus not added oxygen, but merely a gas mixture which is created by mixture of air, which has been admixed with sulfur compounds during its use in a viscose manufacturing plant, with smoke gas, which has been used for enrichment of $H_2S$. For example, the waste gas is preheated in this manner to 200° C. and is then passed into a catalysis apparatus, having a conventional vanadium catalyst arranged in layers of a total height of about six feet, and preferably in the customary manner on trays one stacked above the other. In this apparatus the oxidation of the carbon disulfide and hydrogen sulfide to sulfur trioxide, carbon dioxide and water takes place at a yield of over 98 percent. The heat of the reaction would raise the temperature of the gas and vapor mixture by 420° C., that is to say to 620° C., if no cooling were applied. Because of the preheating of the waste gas and a presumptive heat loss of about 20 percent, the temperature of the catalyzed gas is reduced by 260° C. (175°+85° C.) to 360° C. At this temperature, a formation of condensates cannot take place, particularly if low wall temperatures are avoided in preheating of the waste gas, such as by applying the co-current principle.

It should be emphasized that the sulfur compounds are oxidized to sulfur trioxide by means of such conventional catalysts, which have been used before for the oxidation of sulfur-dioxide to sulfur-trioxide. The vanadium-catalyst is, thus, known and is used generally for the same purpose. The present process may be performed basically with any vanadium containing contact mass, which is available on the free market. Such contact masses contain in addition to vanadium pentoxide or alkali-vanadates also different ingredients which are added as carrier-substances or as a means for increasing the porosity or rigidity. It is known that the oxidation level of the vanadium changes during the working of the contact mass continuously from the 5th to the 4th value and back again. One cannot say, therefore, that the contact mass contains for instance vanadium-pentoxide. For this reason the expression "vanadium- or vanadium-contact-mass" is preferred, though it is well known that no free vanadium is contained therein. It has been experienced that the same contact mass is generally used as for instance "Monsanto-mass."

The hot, catalyzed gas is then passed into a tower through which 78 percent sulfuric acid is circulated in order to absorb part of the sulfur trioxide under formation of sulfuric acid. The heat supplied by the gas and the heat of reaction are eliminated from the acid cycle by cooling with water. Moreover, a quantity sulfuric acid corresponding to the amount of sulfur trioxide is removed as the product of the herein described operation. Because of the presence of water vapors, a sulfuric acid fog forms in the tower during the cooling of the sulfur trioxide gas. This fog is not absorbed by the sulfuric acid, but can be electrostatically precipitated, if desired, with the aid of a fine spray of water. The acid flowing from the electrofilter and comprising, say 40 percent of the production, passes into the cycle of the absorption tower, as clearly set forth above in connection with the detailed description of the flow sheet of FIGS. 1 and 1a.

*Example II*

The first stage of the catalytic oxidation, that is up to the formation of sulfur dioxide, is carried out by means of other catalysts than vanadium compounds, for example by means of iron oxide, bauxite, chamotte fragments and the like. The different catalysts for the oxidation to sulfur dioxide and sulfur trioxide are either arranged in the same catalysis apparatus, for example on different trays, or in several separate devices, suitably arranged. The emphasis being on the use of less expensive catalysts than vanadium compounds. Furthermore, different catalysts may be used in the same converter or in the same converter system.

*Example III*

When using, as in Example I, the same catalyst for all stages of the oxidation, the catalysis apparatus is arranged for a reversal of the direction of flow of the gas. When, owing to a lack of oxygen, the catalyst has been damaged, it is sufficient to treat it at a temperature above 400° C. with sulfur dioxide and an excess of oxygen in order to reestablish its previous activity. As the oxidation to sulfur trioxide takes place at temperatures above 400° C., by changing the direction of the flow of gas, both ends of the catalyst bed can be subjected to this temperature.

FIGS. 2 and 2a indicate a flow sheet of a plant for the production of sulfuric acid according to the vanadium contact process starting with Orkla-gases.

Orkla-waste gases have, for instance, the following composition:

3.850 vol. percent $SO_2$
0.450 vol. percent $H_2S$
0.597 vol. percent $CS_2$
0.979 vol. percent $COS$
0.063 vol. percent $S_2$
0.6 vol. percent $CO$
12.000 vol. percent $CO_2$
81.461 vol. percent $N_2$ Furthermore they contain about:

20 g. $H_2O/Nm.^3$
0.05 g. $As/Nm.^3$
0.003 g. $Pb/Nm.^3$ and
0.03 g. $dust/Nm.^3$ The gases are available at a temperature of about 120° C. In order to remove As, Pb and dust, the gases are washed in the tower 1' by spraying with liquid sulfur. The sulfur flows into a container 3' which is heated by means of a steam coil and is returned to the tower 1' in a circulation by means of a pump 4'. Soiled sulfur is taken out of the circulation and replaced by fresh sulfur, which is available in the Orkla-arrangement. The washed gases flow through one of the separators 2', in order to remove sulfur-droplets which have been carried away, which sulfur-droplets could still contain soiling. The separators 2' are cleaned from time to time with caustic soda. A blower 5' serves as feeding means of the Orkla-gases, thereby, overcoming the pressure loss of the entire system.

Since the Orkla-waste-gases do not contain any oxygen, air is required for the catalytic oxidation. It is intended to produce $H_2SO_4$ of a concentration of 98%. For this reason the air for the contact oxidation is dried. For the same reason the air required for the Orkla-process is likewise dried, in order to reduce, as much as possible the content of water vapor and of $H_2S$ in the Orkla-waste-gases. The drying serves simultaneously the purpose to reduce the dew point of the catalyzed gases, so as to avoid the formation of condensates in the heat exchangers, described below. In order to bring about the drying, a filled tower 18' is provided, which is irrigated with $H_2SO_4$. In order to lead away the created heat, the acid flows through a cooler 19' into a container 20' and returns in a cycle to the tower 18' by means of a pump 21'. The air stream is divided, by means of the blowers 23' and 24' behind a stripper 22' for acid droplets, at a proportion as required in the contact-arrangement and in the Orkla-furnaces, respectively. The air requirement for the catalytic oxidation amounts to 1.05 vol. air to each vol. of Orkla-gas. The air requirement for the Orkla-furnace corresponds approximately with the volume of the Orkla-waste-gas.

The Orkla-gas and a portion of the oxidation air are preheated to the starting temperature of the catalytic oxidation. Since a particular working material is necessary for Orkla-gas at a raised temperature, separate heat exchangers are provided for the preheating of the air and of the Orkla-gas, respectively. By this arrangement a premature reaction of the two gases is simultaneously avoided. The partly and completely catalyzed gas from the contact apparatus serves as a heating means. About 0.48 vol. air for each vol. Orkla-gas are not preheated, but used as a cooling means for direct blowing-in into the contact apparatus. The Orkla-waste-gas is preheated in the heat exchangers 6 and 7, and the air in the heat exchangers 8 and 9. In the mentioned heat exchangers the gases flow around the coils. In the coils of the heat-exchangers 6 and 8, partly catalyzed gas moves about and in the coils of the heat exchangers 7 and 9, completely catalyzed gas moves in co-current with the gases to be preheated.

Vanadium-contact-mass is disposed in the converters 10 and 11 in form of three trays. In order to feed both preheated gases separately up to the contact mass, a concentric double-tube is arranged in the center of the converter 11, Orkla-gas flowing through the inner tube and air flowing through the outer tube. Since steel is attached by Orkla-waste-gases at a raised temperature, the tube bottoms and the jackets of the heat exchangers 6 and 7, as well as the piping from the heat exchanger 6 to the converter 11 are made of stainless steel. All other parts are made of ordinary steel or iron casting. The heat exchangers are dimensioned in such a manner, that the Orkla-waste-gases and the said portion of air may be preheated up to about 300° C. In the two first contact-trays about 70% of the total thermal tonality is freed, so that the temperature may rise up to 560° C. By blowing-in of 0.18 vol. of non-preheated air for each vol. of Orkla-waste-gas, the temperature is lowered to 515° C., is raised by further 13% of the total thermal tonality in the third contact tray to about 550° C., and is then lowered in the intermediate heat exchangers 6 and 8 to about 420° C. In the converter 10 further 7.5 and 2% of the total thermal tonality are freed in the fourth, fifth and sixth contact trays. 0.15 vol. of non-preheated air is blown-in into each of the contact trays 4 and 5 for each vol. of Orkla-gas, so that the gas emerges from the converter at a temperature of about 400° C. In the end heat exchangers 7' and 9' the temperature of the catalyzed gases is lowered to about 365° C.

The catalyzed gases enter at about the same temperature in a filled tower 12', where they are irrigated with $H_2SO_4$ of a concentration of about 98.5%, in order to absorb the $SO_3$. In order to lead away the perceptible heat and the reaction heat, the acid flows from the tower 12' through a cooling device 14' into a condenser 16' and is returned in circulation to the tower 12' by means of the pump 17'. During such circulation acid is fed continuously to the drying tower 18', the concentration of said acid being reduced to 96%. Since the catalyzed gas contains humidity, a portion of the $SO_3$ is condensed to sulfuric acid-mist, which cannot be precipitated completely in the absorber. In order to regain still that portion of the acid, two separators 13' are provided, the condensate of which flows into the condenser 16'. Water, which is still further required for the formation of $H_2SO_4$, is fed into a mixing container 15'. The final product is taken off as sulfuric acid of a concentration of about 98% from the acid circulation of the absorption tower at a predetermined suitable point.

Enrichment methods are known for waste gases, which contain only small quantities of sulfur compounds, which methods increase the content of $H_2S$ so much, that the gas receives the thermal value which is necessary for a further processing. In such factories which produce artificial material in accordance with the viscose-process, it is known to provide an enrichment of the $H_2S$ in such a manner, that it is washed from the waste gases by means of caustic soda and then is driven out again from the sodium-sulfide solution by means of $CO_2$ or $H_2SO_4$, for instance to make usable the $H_2S$ and a portion of the $CS_2$. In the case of using $H_2SO_4$, the removal of $H_2S$ from the acidic solution is supported by blowing with air. If such enrichment is performed with the total output air, a great portion of the $CS_2$ is lost, since the gases are blown into the atmosphere after their washing and caustic soda absorbs $CS_2$ rather incompletely only.

The waste gases emerging from the different divisions of a viscose manufacturing plant have different compositions. Thus, for instance, the waste gases, emerging from the precipitation and after-treatment of the fiber, are comparatively poor of $H_2S$ and $CS_2$, for instance 0.2 g. $H_2S/m.^3$ and 0.65 g. $CS_2/m.^3$, yet as to their volume constitute the greater part of the output air. The waste gases of the so-called acid-station, where the refining bath operation is performed, are richer of $H_2S$ and $CS_2$, for instance 15 g. $H_2S/m.^3$ and 6 g. $CS_2/m.^3$, yet constitute the lower proportion of the total output air. Output air rich of $CS_2$ emerges also from the xanthogenation, for instance 24 g. $CS_2/m.^3$.

It has been found, that the applications of the previously described method may be increased, if an enrichment of the waste gases emerging from a viscose manufacturing plant is performed in such a manner that only that portion of the output air which is poorer of $H_2S$ and $CS_2$, but contributes the greater proportion of the output air is treated with caustic soda, the created solution containing sodium-sulfide is subjected to acidification with $H_2SO_4$ and is blown out together with the smaller proportion of output air which is richer of $H_2S$ and which contains also a greater portion of $CS_2$. In this manner a gas is obtained which is enriched of $H_2S$ and which contains an appreciably larger amount of $CS_2$, as can be obtained by using known working processes. This is a particular advantage for the previously described method, because the more $CS_2$ is present in proportion to $H_2S$, the lower is the initial temperature below 290° C. Furthermore, the $CS_2$ provides an appreciable contribution to the reaction heat, so that gases may be processed, which would be too poor without the proportion of $CS_2$.

*Example IV*

Output air from the precipitation and after-treatment of the fiber:

200,000 $Nm.^3/h.$
210 mg./$Nm.^3$ $H_2S$
650 mg./$Nm.^3$ $CS_2$

For the absorption of the $H_2S$ caustic soda containing hemicellulose and emerging from the main process, namely dialyzator-output-soda with 40 g./l. NaOH is used. The just mentioned portion of output air is washed in irrigation towers or in spray chambers with said caustic soda. In order to provide acidification, sulfuric acid emerging from the main working process and having a concentration of 0.2%, namely spray and washing acid is used, which is fed jointly with the sulfide containing soda from above to an irrigation tower, while the portion of output air emerging from the acid station and from xanthogenation is blown-in from below. This portion of output air is available at an amount of 1490 $Nm.^3/h.$ with a content of 15 g./$Nm.^3$ $H_2S$ and 6 g./$Nm.^3$ $CS_2$.

The temperature of the liquid is 28° C. at the bottom of the tower. The particular portion of the output air enters the tower from below at 38° C. and escapes above at a temperature 21° C. The liquid flowing off leads away some of $H_2S$ in accordance with its dissolubility. A loss of, for example, 2.8% of the production of sulfuric-acid monohydrate is caused thereby. The gases emerging from the tower are saturated with moisture.

They contain:

45 g./$Nm.^3$ or 2.93 vol. percent $H_2S$
6.5 g./$Nm.^3$ or 0.19 vol. percent $CS_2$
20 g./$Nm.^3$ or 2.60 vol. percent aqueous vapor In order to reduce the losses of $H_2S$, which are caused by the liquid running off from the tower, superheated steam or saturated steam is blown in from below. For adjustment to a predetermined water content, for example, if sulfuric acid for a predetermined concentration is to be prepared from the emerging gases, a cooling device is provided for the acid fed to the tower. In this manner the output temperature, and, thereby, the moisture content of the gases is reduced.

The gases thus obtained are subjected to further process, as indicated before.

The blowing of $H_2S$ freed from the sodium-sulfide solution with the richer proportion of the output air is generally possible only, if the gases are subjected to further process, as set forth above. The emerging gases are normally too poor for a conventional processing for a combustion prior to the contact oxidation, since the blowing out takes place with the total amount of the comparatively larger and richer proportion of the output air, if all of H₂S is to be gained. This method and the method set forth previously thus complement each other in a most favorable manner.

The present invention was particularly described in connection with the recovery of products from the output air emerging from viscose manufacturing plants. This origin of the output air is, however, given by example only. The origin of the two gas mixtures, one of which is subjected to an enrichment process, while the other of which serves to receive the enriched portion, may vary. The enrichment process may also be performed in the most favorable manner depending upon the particular circumstances without abandoning the scope of the present invention.

While I have disclosed several embodiments of the present invention, it is to be understood that these embodiments are given by example only and not in a limiting sense, the scope of the present invention being determined by the objects and the claims.

I claim:

1. A process of removing sulfur substances selected from the group consisting of gaseous sulfur and sulfur compounds from a higher sulfur content stream of waste gas other than waste gas comprising only sulfur dioxide and from a lower sulfur content stream of waste gas other than waste gas containing only sulfur dioxide, comprising the steps of enrichment of one of said streams with hydrogen sulfide, mixing the other of said streams wtih said enriched hydrogen-sulfide stream, mixing the resulting stream with an oxygen containing gas, sulfficient to oxidize the sulfur components to sulfur trioxide, passing said mixture into a catalytic chamber containing a vanadium catalyst after preheating to about 200° C. to 300° C. in a concurrent heat exchanger with catalyzed gas passing from said catalytic chamber to form sulfur trioxide.

and then cooling said gas to a temperature above its dew point and absorbing said sulfur trioxide in sulfuric acid, said step of enrichment with hydrogen sulfide being carried out by washing said stream originally having the lowest sulfur content with caustic soda to form a sodium sulfide solution, treating said sodium sulfide solution with dilute sulfuric acid to liberate hydrogen sulfide, and then blowing out the liberated hydrogen sulfide with the other of said streams.

2. A process of removing sulfur substances selected from the group consisting of gaseous sulfur and sulfur compounds from a higher sulfur content stream of waste gas other than waste gas comprising only sulfur dioxide and from a lower sulfur content stream of waste gas other than waste gas containing only sulfur dioxide, comprising the steps of enrichment of one of said streams with hydrogen sulfide, mixing the other of said streams with said enriched hydrogen-sulfide stream, mixing the resulting stream with an oxygen containing gas, sufficient to oxidize the sulfur components to sulfur trioxide, passing said mixture into a catalytic chamber containing a vanadium catalyst after preheating to about 200° C. to 300° C. in a concurrent heat exchanger with catalyzed gas passing from said catalytic chamber to form sulfur trioxide, and then cooling said gas to a temperature above its dew point and absorbing said sulfur trioxide in sulfuric acid, the sulfur compound in the stream of waste gas having the lower sulfur content being hydrogen sulfide, and the sulfur compound in the stream of waste gas having the higher sulfur content being selected from the group consisting of hydrogen sulfide and carbon disulfide, said step of enrichment with hydrogen sulfide being carried out by washing the stream originally having the lower concentration of hydrogen sulfide with caustic soda to form a sodium sulfide solution, treating said sodium sulfide solution with dilute sulfuric acid to liberate hydrogen sulfide, and then blowing out the liberated hydrogen sulfide with the other of said streams.

References Cited in the file of this patent

UNITED STATES PATENTS

| | | |
|---|---|---|
| 1,900,751 | Baehr | Mar. 7, 1933 |
| 2,003,442 | Hechenbleikner et al. | June 4, 1935 |
| 2,363,738 | Mather et al. | Nov. 28, 1944 |
| 2,449,190 | Belchetz | Sept. 14, 1948 |
| 2,879,135 | Haltmeier | Mar. 24, 1959 |